United States Patent
Kondo et al.

[15] 3,705,286
[45] Dec. 5, 1972

[54] ELECTRIC DISCHARGE MACHINING DEVICE

[72] Inventors: Iwao Kondo, 39-9 Kitamachi 1-chome, Nerima-ku, Tokyo; Kenjiro Taoka, 12-7 Taishido 2-chome, Setagaya-ku, Tokyo; Kenji Sasagawa, 4-16 Higashimagome 1-chome, Oota-ku, Tokyo, all of Japan

[22] Filed: Jan. 21, 1971

[21] Appl. No.: 108,330

[52] U.S. Cl. ............... 219/69 C, 219/69 G, 219/69 S
[51] Int. Cl. .......................... B23p 1/08, B23p 1/14
[58] Field of Search ......... 219/69 C, 69 G, 69 P, 69 S

[56] References Cited

UNITED STATES PATENTS 2,882,437  4/1959  McKechnie ............... 219/69 G X
3,340,478  9/1967  Poerschke ............... 219/69 G X

*Primary Examiner*—R. F. Staubly
*Attorney*—Waters, Roditi, Schwartz & Nissen

[57] ABSTRACT

An electrical discharge machining device comprising a plurality of detectors for detecting currents and voltages at different parts of the device and generating detection signals in response to the detection, a logic circuit for determining different machining conditions of the device by logical combination of the detection signals so as to generate different discerning signals corresponding to the different machining conditions, and a control means for controlling the machining device based on relative frequency ratios of different discerning signals. Said relative ratios may be determined by using integrating circuits.

10 Claims, 8 Drawing Figures

ELECTRIC DISCHARGE MACHINING DEVICE

This invention relates to an improvement of an electrical discharge machining device, which causes electric discharge between an electrode and a workpiece for removing, shaping, grinding, and/or cutting of desired portions of the workpiece.

Generally speaking, the electric discharge between an electrode and a workpiece in an electrical discharge machining device causes the following phenomena, which are all well known to those skilled in the art.

1. A comparatively high gap conductance is generated across a gap between the electrode and the workpiece, due to the formation of decomposition products in the gap.
2. If an excessively large electric current is forced through the electrode and the workpiece, or if the value of a duty factor ($\tau/T$, $\tau$ being the duration of machining pulse, and T being the period of the machining pulse) is selected to be excessively large, the insulation across the machining gap between the electrode and the workpiece cannot fully be recovered after each machining discharge, so that the so-called arcing condition is established.
3. Sometimes, the electrode is short-circuited with the workpiece, and no effective electric discharge can take place across the aforesaid machining gap.
4. If the spacing between the electrode and the workpiece is too large, there will be no electric discharge across the gap therebetween.
5. It is possible to maintain a stable discharge across the electrode and the workpiece.

The applicant has proposed a means for independently detecting voltage and current at different parts of the electrical discharge machining device, for detecting each of the aforesaid conditions by logical combinations of the quantities thus detected, as disclosed in his Japanese Pat. applications Ser. No.9,555, No.46,422, No.46,423 and No.46,424, which were all filed in 1969.

In an electrical discharge machining device incorporating such logical control elements, two kinds of control orders may substantially simultaneously be delivered, (depending on the structure of the logic circuit). The two control orders may be a. two different logical control orders;
b. two orders of the same logical control operation; or
c. two logical control orders of opposite physical natures.

For certain combinations of such two control orders, the electrical discharge machining device may not be able to respond to them in a stable manner and its operation may be endangered.

Therefore, an object of the present invention is to obviate such difficulties of conventional electrical discharge machining device with a logical control circuit. In an electrical discharge machining device according to the present invention, the arcing condition and the occurrence of high gap conductance, which take place at random, are statistically treated, so as to automatically control the device for effecting the machining under optimum operative conditions. With the device of the present invention, the occurrence of high gap conductance can be detected, and the raising time of the electrode can automatically be selected.

In order to fulfill the aforesaid object, in the device of the present invention, the voltage and the current at different parts of the device are independently measured, so as to combine the quantities thus measured in a logical manner for discernibly detecting various operative conditions of the device; namely, the short-circuited condition, the arcing condition, the normal discharge condition, the non-discharge condition, and the occurrence of high gap conductance. Upon detection of each of such different operative conditions, the device generates corresponding discerning signals, and the operation of the device is controlled by using the relative frequency of such discerning signals for regulating the different control factors of the machining device; namely, the peak value of the machining current, the pause time for the machining current, the raising time for the electrode, the duty factor ($\tau/T$), the pressure for injecting machining fluid, the short-circuit current, etc. One of the salient features of the present invention is in the detection of a quantity which represents the magnitude of the gap conductance, based on the relative frequency of the detection signals, so that the electrode raising time can be determined depending on the quantity representing the magnitude of the gap conductance.

The use of a counter between the electrode and the workpiece for the purpose of detecting the frequency of the discharge is known, as disclosed by Yoshiaki MITANI in his paper submitted to the Forty-second Electrical Discharge Machining Conference. A control device for temporarily reducing the duty factor ($\tau/T$) in response to the reduction of instantaneous voltage across the electrode and the workpiece below a certain limit is also known, as incorporated in the Type SD8 Electrical Discharge Machining Device manufactured by Taoka Manufacturing Work. The device of the present invention is, however, different from such prior art in that the input information for regulating the duty factor ($\tau/T$) and the manner in which the input information is logically treated are different.

Another object of the present invention is to provide a means for controlling the machining operation of an electrical discharge machining device by using the ratio between discerning signals (signals representing different operative conditions of the machining device) and output signals from a pulse generator or by using relative densities of different detection signals, so as to regulate different control factors of the machining device; such as, the peak value and the pause time of the machining current, the electrode raising time, the raising and lowering speed of the electrode, the duty factor ($\tau/T$), the injecting pressure of the working fluid, the short-circuit current, etc.

Another feature of the present invention is in that integrating circuit dealing with analog quantities are used for determining the ratio between the discerning signals and the output signals from a pulse generator or the relative densities of different detection signals.

Other objects and advantages of the present invention may be appreciated by referring to the following description, taken in conjunction with the accompanying drawings, in which:

FIG.4A is a graph, showing the waveforms of pulse voltages;

Figure 1:
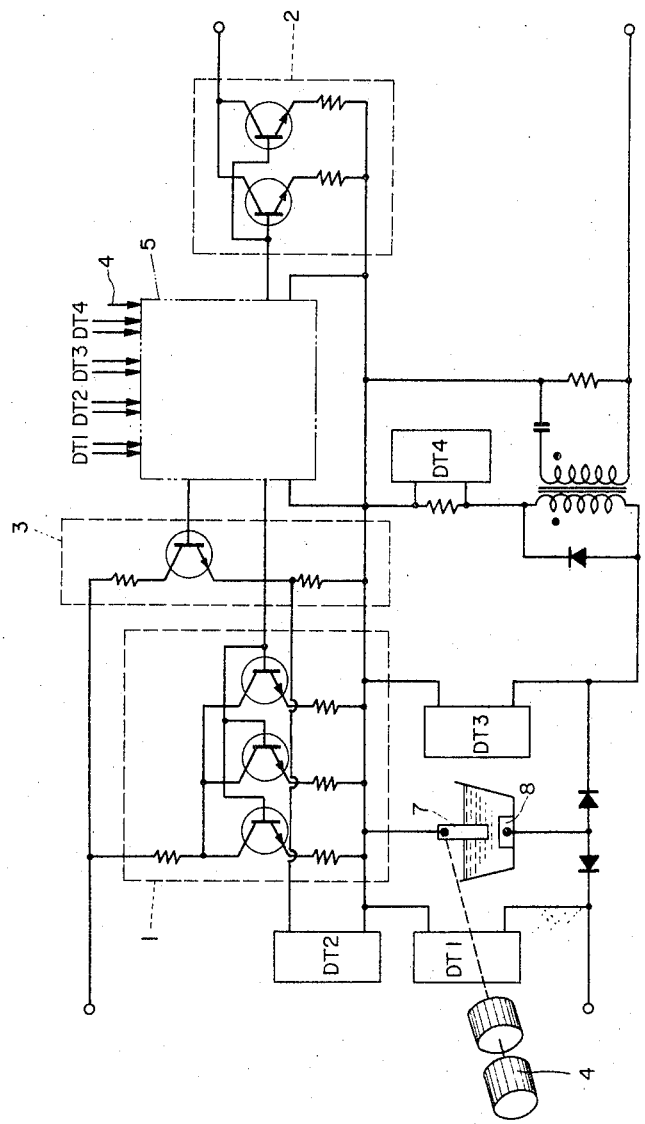
FIGS. 1 and 2 are electrical circuit diagrams, schematically illustrating an embodiment of the present invention.
Figure 2:
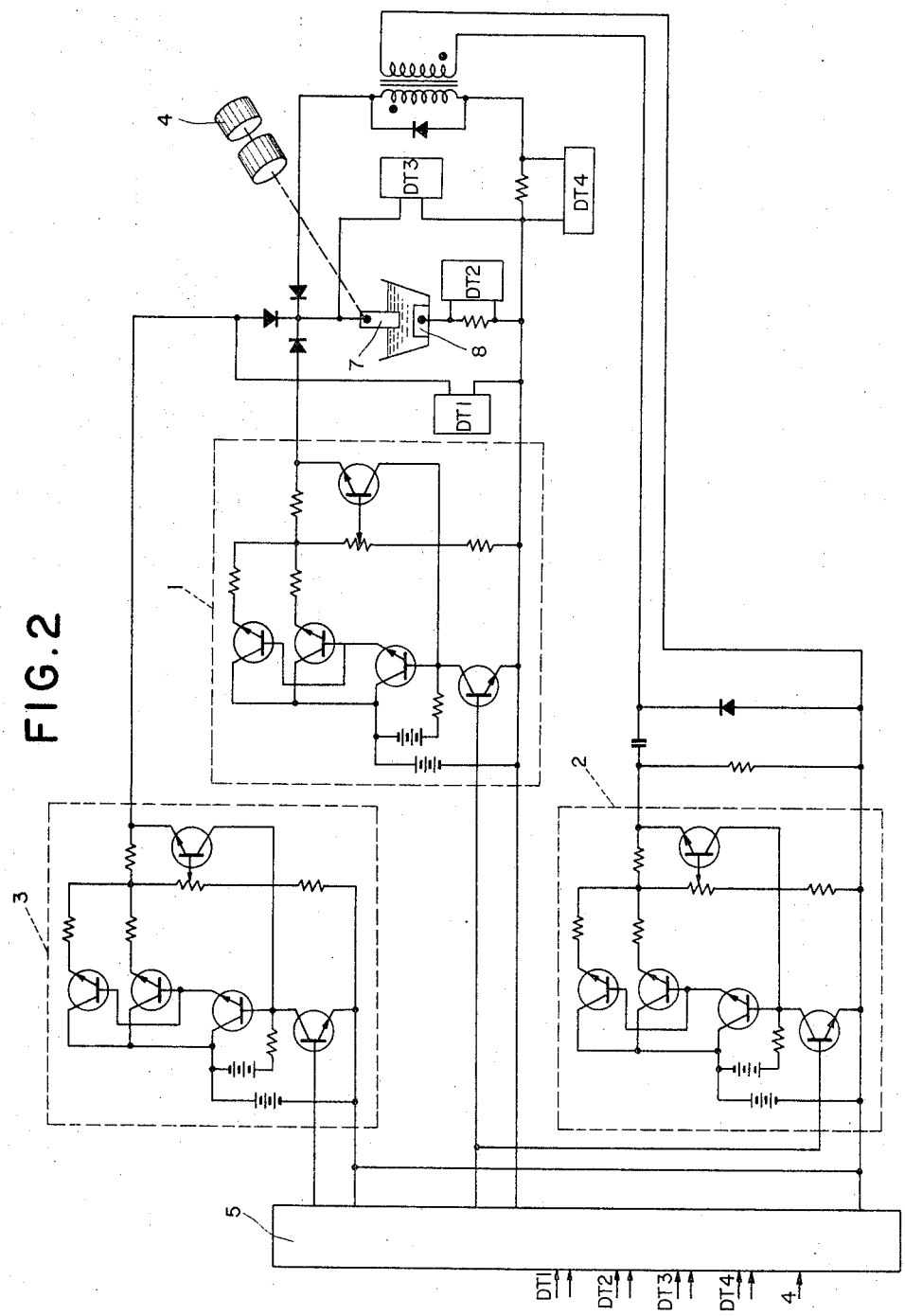

Referring to FIGS. 1 and 2, an electrical discharge machining device according to the present invention comprises a low-voltage large-current D.C. chopper 1 for machining current, another D.C. chopper 2 for generating a high voltage, a low-voltage medium-current D.C. chopper 3 for detecting the arcing condition, an encoder 4 for detecting the amount of the upward or downward movement of an electrode 7 in the form of pulses, and a control circuit pulse generator 5 for controlling the discharge machining device in response to the operative conditions of the device. Four detectors DT1 to DT4 are used for detecting the voltages and currents at different parts of the device in an independent or separate fashion, and each detector is usually made of a Schmitt circuit or a differential amplifier which is usually referred to as a comparator. The output voltage from the comparator can be set within any desirable range by using a voltage divider or the like. The detector DT1 acts to detect the low voltage pulse for machining and for detecting the arcing condition, DT2 acts to detect the machining current and an arc current, DT3 acts to detect the high voltage for insulation breakthrough, and DT4 acts to detect a small current at a high voltage.

Figure 3:
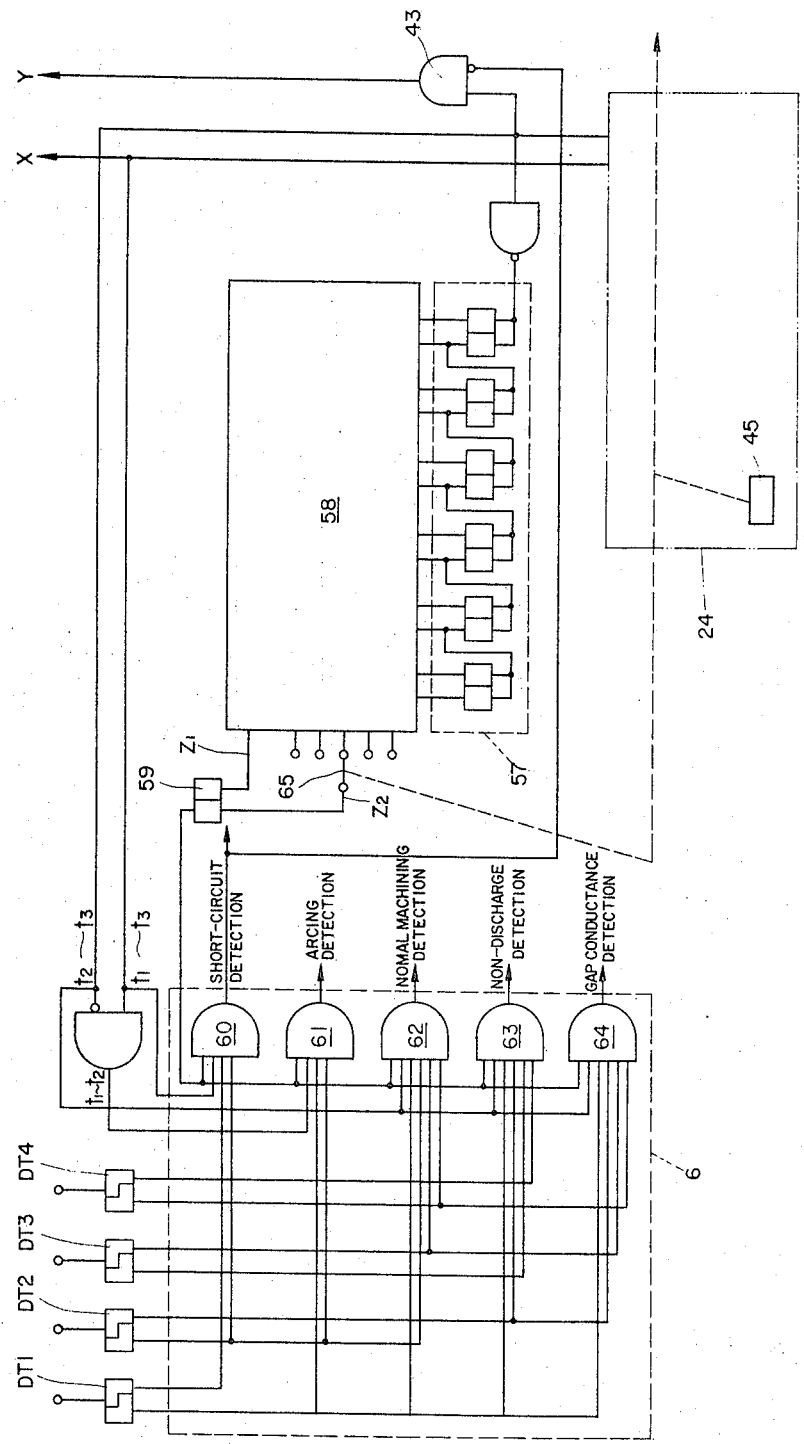
FIG. 3 is a schematic diagram of a logic circuit for detecting the operative conditions of the discharge machining device.
Figure 4:
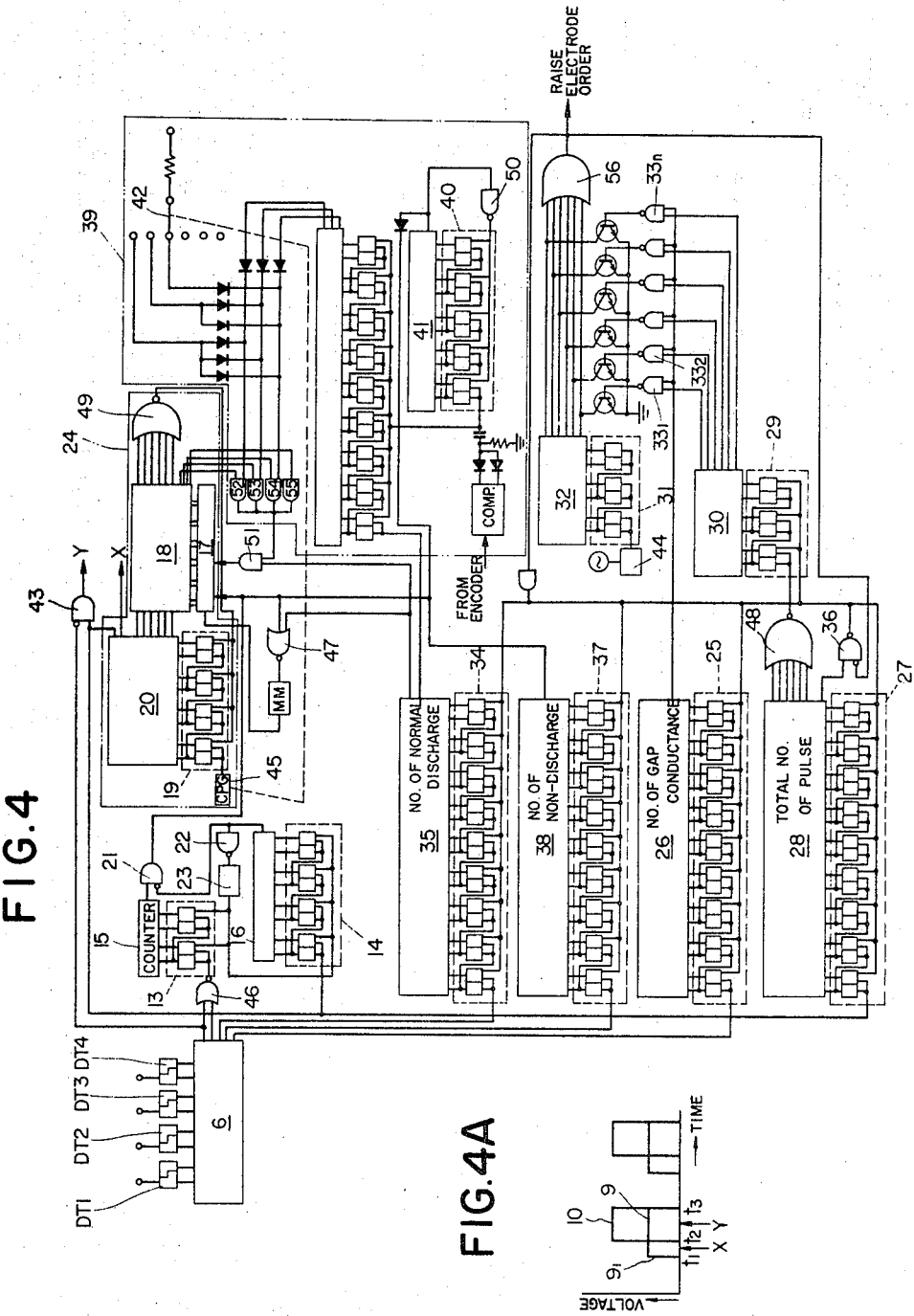
FIG. 4 is a schematic diagram of a control circuit for regulating the machining device in response to the operative conditions thus detected.

FIG. 4 illustrates the detailed construction of the control circuit 5, which includes a combination of counters, matrix circuits, and gating circuits. In the figure, the output signals from the four detectors DT1 to DT4 are fed to a logic circuit 6, so as to detect different operative conditions of the machining device, such as short-circuit, arcing, normal discharging, lack of discharge, and the occurrence of a high gap conductance. A practical example of the logic circuit 6 is shown in FIG. 3.

Let it now be assumed that the duty factor ($\tau/T$) is variable. In case of the arcing condition, the duty factor ($\tau/T$) must be reduced. For the clarity's sake, it is now assumed that the discharge machining device has been operated under normal discharge conditions, and now an increase in the duty factor ($\tau/T$) is found to be advisable. If the time difference between the finding of the advisability of an increase in the duty factor and a phenomenon requiring a reduction of the duty fact is very small, the control circuit 5 may cause the duty factor ($\tau/T$) to slightly fluctuate for a moment, but such fluctuation will not cause any sustained change in the duty factor. If the logic circuit 6 is such that the duty factor ($\tau/T$) is automatically varied by a rotary solenoid or the like, the logic circuit may generate one of the following three kinds of orders in response to the input signals thereto.

a. To reduce the duty factor ($\tau/T$).
b. To increase the duty factor ($\tau/T$).
c. To hold the duty factor ($\tau/T$).

The output from such automatic logic circuit is determined based on the operative conditions of the discharge machining device, and the performance characteristics of its components, e.g., the rotary solenoid.

The present invention makes use of a parallel logical control, to which N logical detector output signals are applied as input signals to M operational circuits (for effecting a set of mathematical operations or judgments in parallel, as far as the time is concerned). In such parallel logical circuit 6, sometimes its output signals may contradict with other control signals, or the circuit 6 may generate insignificant control orders, unless the logical circuit 6 is carefully prepared.

When the duty factor ($\tau/T$) is made variable, as assumed in the foregoing, it is a safe practice to give priority to the reduction of the duty factor ($\tau/T$). In other words, the order for increasing the duty factor ($\tau/T$) need not be prosecuted instantly. In the control circuit 5 of the present invention, the actual priority is given by increasing the counts for the order of increasing the duty factor ($\tau/T$), while reducing the counts for the order of decreasing or reducing the duty factor ($\tau/T$). Thus, the uncertainty of the operation associated with the conventional rotary solenoid type control circuit can completely be eliminated with the device of the present invention.

The control circuit 5 of the present invention does not produce any contradictory orders, even if the necessity of the gap conductance control (raising the electrode) and the necessity of the reduction of the duty factor ($\tau/T$) due to arcing are simultaneously noticed. This elimination of the contradictory orders is made possible, because an operative order signal which is responsive to the gap conductance is entirely different from another operative order signal which is responsive to the detection of the arcing condition, so that the two operative order signals can be prosecuted for carrying out the different control operations attributable to the two orders.

The detection of different operative conditions of the discharge machining device and the actions to be taken for each of the different operative conditions thus detected will now be described.

Short-circuit between the electrode 7 and the workpiece 8:

When the electrode 7 is short-circuited with the workpiece 8, the machining operation becomes ineffective, and a large short-circuit current flows therethrough. Referring to FIG.4A, the occurrence of such short-circuit can be detected by checking the presence of a low voltage across the electrode 8 and the workpiece 8 by the detector DT1 and the presence of a large short-circuit current therethrough by the detector DT2, during the period of time from the time $t_1$ when a low voltage pulse $9_1$ is applied thereto for arcing detection to the time $t_3$ when the machining low voltage pulse 9 and the insulation breakthrough high voltage pulse 10 are removed therefrom. The signals thus detected by the detectors DT1 and DT2 are applied to the logic circuit 6 for processing, and the logic circuit 6 generates a discerning signal indicating the presence of the short-circuit across the gap between the electrode 7 and the workpiece 8 in response to the simultaneous presence of output signals from the detectors DT1 and DT2. Referring to FIG. 4, the discerning signal thus generated acts to control a reversible counter 17 of the control circuit 5 through a counter 13 and a short-circuit or arcing counting matrix 15 as well as through a total pulse counting counter 14 and a total pulse counting matrix 16. The output from the reversible counter 17 controls a duty factor selecting matrix 18 so as to quickly reduce the prevailing duty factor as determined by a counter 19 and a duty factor determining matrix 20, for quickly recovering the machining device from the short-circuit conditions to the normal operative conditions. It is also possible to reduce the arcing current or the short-circuit current during the time period $t_2$ to $t_3$ by using an AND gate 43, as shown in FIGS. 3 and 4.

Accordingly, upon occurrence of a short-circuited conditions or the arcing conditions, either the duty factor ($\tau/T$) or the short-circuit current is quickly reduced, for stabilizing the machining operation. Thus, the response of servo magnets and servo motors need not be very fast, so that conventional servo system based on the average voltage can be used without necessitating any extensive modification.

Occurrence of arcing across the electrode 7 and the workpiece 8:

Since the discharge machining itself is a kind of short-time arcing for machining process, the occurrence of the arcing conditions across the electrode 7 and the workpiece 8 does not cause any seriously adverse effects on the machining surface, as long as the duration of such arcing is short. If a condition which is easily transferable to the arcing should be sustained for an extended period of time, the machined surface is roughened, and in addition, it becomes more difficult to generate impulsive pressure accompanying the insulation breakthrough, so that the machining operation is greatly disturbed.

Thus, as soon as the arcing conditions are detected, comparatively quick measures should be taken, such as the reduction of the peak value of the machining pulse current 9, the reduction of the duty factor ($\tau/T$), or the raising of the electrode 7. The arc voltage for the sustained arc is about 20 volts to 25 volts, and it is lower than the machining arc voltage (transient arc voltage), so that conventional electrode servo mechanism can be used for raising the electrode 7. On the other hand, the logic control means of the present invention must be used for the reduction of the peak value of the machining pulse current 9 and for the reduction of the duty factor.

It should be noted here that, due to the random nature of the arcing phenomena, the prosecution of the arc-suppressing measures at each occurrence of the arcing may sometimes deteriorate the machining efficiency. Thus, the present invention takes a kind of statistical approach to the arcing conditions. More particularly, referring to FIG. 4, the detection pulses from the logic circuit 6 representing the presence of the arcing conditions are counted by the pulse counter 13, while counting the total number of pulses by the total pulse counter 14. If the counter 13 generates Q counts or more, while the total pulse counter 14 counts P counts ($P \geq Q$), the output from the counting matrix 15 acts to control the reversible counter 17 through an AND gate 21, so as to reduce the duty factor ($\tau/T$), as in the case of the short-circuit.

Accordingly, the reduction of the duty factor is initiated when the ratio of the counts of the counters 13 and 14 becomes a preset value of Q/P or more. The inventor has disclosed a means for reducing the peak value of the machining pulse current 9 when a certain ratio (such as the aforesaid Q/P) is achieved (see Japanese Patent application Ser. No.4,538 1969).

On the other hand, if the ratio is smaller than the aforesaid value Q/P, i.e., if no serious arcing takes place, the matrix 15 does not produce any output signals, so that the AND gate 21 is not actuated and the duty factor is held unchanged. Under such conditions, a total pulse counting matrix 16 generates an output signal prior to the output from the short-circuit or arcing counting matrix 15, so that a phase-reversing gate 22 (a negation circuit) is actuated together with a monomulti vibrator 23, for resetting the counters 13 and 14. It is apparent to those skilled in the art that the value of the ratio Q/P can be set at will by properly regulating the diode matrices 15 and 16.

Occurence of a high gap conductance across the electrode 7 and the workpiece 8:

Since the discharge across the electrode 7 and the workpiece 8 is a kind of random phenomenon, the occurrence of a high conductance during one machining pulse does not necessarily mean the occurrence of another high conductance during the next machining pulse. Thus, it is sufficient to take actual measure only when ratio between the output pulses from an oscillator 24 and the number of occurrences of high gap conductances exceeds a certain limit, which oscillator 24 comprises a counter 19, and matrices 18, 20. The measures to the high gap conductance need not be so quick as those to the short-circuit and the arcing.

Referring to FIG. 4, the logic circuit 6 detects each occurrence of the high gap conductance to generate the detection pulses representing such occurrence of the high gap conductance, and a pulse counter 25 acts to count such detection pulses, and when its count becomes S, the counter causes a matrix 26, which is controlled by the counter 25, to produce an output. At the same time, a matrix 28 acts to check to which extent a counter 27 has counted out of output pulses $R_1$ to $R_n$ from the oscillator 24. As the values of the ratios $S/R_1$ to $S/R_n$ become larger, the frequency of the occurrence of the high gap conductance is more frequent.

By using a counter 29 and a matrix 30 to which the output from the matrix 28 is applied, the range of the ratios $S/R_m$ and $S/R_{m-1}$ is determined, so as to cause AND gates $33_1$ to $33_n$ to select a proper electrode raising time as determined by a counter 31 and a matrix 32. It is a common practice to select a larger raising time for the electrode 7 as the ratio $S/R_m$ or the gap conductance is larger. Here $m$ is an arbitrary positive integer, which satisfies the condition of $1 \leq m \leq n$.

Normal discharge across the electrode 7 and the workpiece 7:

In the illustrated embodiment of the present invention, the control circuit 5 detects the normal discharges across the electrode 7 and the workpiece 8 by means of the logic circuit 6 for generating detection pulses representing such normal discharges, and the combination of a counter 34 and a motrix 35 counts such detection pulses. When the frequency of the normal discharges exceeds a certain predetermined level, the control circuit of the invention may increase the duty factor.

During the normal discharges, as the counter 34 counts such normal discharges, the total number of pulses from the oscillator 24 is counted by the counter 27. When the count of the normal discharges becomes $u$ or more, if the count of the counter 27 is less than a preselected reset pulse number V stored in the matrix 28, the output from the matrix 35 acts to control the reversible counter 17, so as to open the gate for increasing the duty factor ($\tau/T$) and the duty factor ($\tau/T$) is increased.

Then, as the count of the counter 27 for the total pulse of the oscillator 24 reaches the preselected count V, a signal from a phase reversing gate 36 simultaneously resets the counters 34, 37, 25, and 27 for restatrating the count from nil.

Extended non-discharging condition:

The extended non-discharging condition is detected by the logic circuit 6 and the detection pulses from the logic circuit corresponding to this condition is counted by a counter 37, and when the count becomes a preselected value W, the output signal from a matrix 38 acts to control the reversible counter 17 for reducing the duty factor ($\tau/T$).

When the normal discharge does not take place for an extended period of time, the restarting of the machining operation after reducing the duty factor will, in effect, cause the machining operation to start with a comparatively small mean machining current, so that the machining operation can be effected stably. The reduction of the duty factor in response to the lack of normal discharge has heretofore been manually effected, but with the present invention, it can automatically be effected, so that the man-hours necessary for the machining operation can greatly be saved.

In the control circuit 5, as illustrated in FIG. 4, an equivalent-electrode area detecting circuit 39 is provided (see the present applicant's Japanese Pat. application Ser. No. 58,503/1969), which detecting circuit 39 acts to select the maximum duty factor based on the relation between the normal discharge frequency and the velocity of the vertical movement of the electrode 7 (as represented by the time-wise pulse density of the output from the encoder 4). If the electrode 7 tends to move vertically too frequently (hunting), a counter 40 and a matrix 41 having a certain preset value therein act to cause the circuit 39 to reduce the duty factor. It is possible to dispense with the detecting circuit 39, because its function can be fulfilled by the counters 13, 14 and the matrices 15, 16.

In the circuit of FIG. 4, a switch 42 is provided. For finishing work with a comparatively small pulse duration $\tau$, it is well known through experiences that if the duty factor ($\tau/T$) is too large, the finishing operation tends to cause sustained arcing. Thus, the switch 42 is provided so as to manually set the maximum duty factor ($\tau/T$) when the duration $\tau$ of the machining pulse is selected. Accordingly, with the control circuit 5, as illustrated in FIG. 4, the machining operation is carried out with a duty factor ($\tau/T$) which is smaller than its maximum value set by the switch 42.

The oscillator 24 generates pulses with a constant duty factor ($\tau/T$) while allowing the variation of the pulse duration $\tau$, (as disclosed in the present applicant's Japanese Pat. application Ser. No. 9,556/1969), provided that the duty factor ($\tau/T$) is automatically selected by the combination of the reversible counter 17 and the matrices 18 and 20.

In the control circuit of FIG. 4, a pulse output terminal X is provided for delivering a low-voltage pulse $9_1$ during the time period $t_1$ to $t_3$, prior to the machining pulse 9, for the sake of detecting the arcing condition. Another terminal Y is used for delivering the insulation breakthrough pulse 10 during the time period $t_2$ to $t_3$ in synchronism with the machining pulse 9. Referring to FIG. 3, the machining pulse 9 is delivered through an AND gate 43 to the D.C. choppers 1 and 2 of FIG. 1. Whereby, when the gap across the electrode 7 and the workpiece 8 is short-circuited, the machining pulse 9 is blocked and not applied to the choppers 1 and 2, so as to suppress the short-circuit current to a very low level. With the machining circuit of FIG. 2, if the machining current increases in excess of a certain limit, the machining current is automatically reduced, so that the aforesaid AND gate 43 can be dispensed with.

Referring to FIG. 4 again, the reference numeral 44 and 45 represent clock pulse generators, 46 to 49 phase-reversing OR gates, 50 a phase-reversing AND gate, 51 to 55 AND gates, and 56 an OR gate.

The logic circuit 6 is sampled in logical time by means of the output from the oscillator 24. Referring to FIG. 3, the output signals from the oscillator 24 at the terminals X and Y are counted by a counter 57, and when the count in the counter 57 reaches a preselected value which is set in a matrix 58, output signals are delivered to the terminals $Z_1$ and $Z_2$ alternatingly, so that the operative conditions of a flip-flop 59 are alternatingly turned over by such output signals from the matrix 58.

For instance, let it be assumed that AND gates 60 to 64 are open when there is an output signal on the output terminal $Z_2$ (or contrarily to be closed), and that the counter 57 make one turn in $m$ pulses to come back to its initial position, then $(Z_2 - Z_1)/m$ pulses are sampled, so that the logic circuit 6 becomes operative for the durations of such pulses, while remaining in-operative for the rest of the time.

The reasons for using such sampling is as follows. When the pulse duration $\tau$ is selected to be short for machining pulses, the repetition frequency $f$ of the machining pulse automatically increases, so that the repetitive duration is shortened to affected various parts of the control circuit 5; namely causing the instantaneous overflow of the counters 14, 15, 25, 27, 34, and 37 of the control circuit 5, causing the counts to reach the preset values in very short time for actuating the reversible counter 17 in very short time intervals, increasing the frequency of the gap conductance detection, causing the electrode 7 to be raised for a period longer than the machining time, etc. Thus, it is necessary to actuate the logic circuit 6 by suitable sampling.

In such sampling, the sampling ratio $(Z_2 - Z_1)/m$ must be determined depending on the variation of the mean machining frequency in response to the change in the duration $\tau$ of the machining pulse. For instance, if the pulse duration $\tau$ is reduced to one thousandth, the sampling ratio $(Z_2 - Z_1)/m$ should also be selected at about one thousandth. In the illustrated logic circuit 6, the counter 57 is not reset upon the overflow of the counter 57, because the sampling ratio $(Z_2 - Z_1)/m$ need not be very acurate. The values of the quantities $m$ and $(Z_2 - Z_1)$ can arbitrarily be selected. In practice, the value of $Z_1$ is selected to be either 1 of 0, and the value of $Z_2$ is varied by operating a switch 65. It is preferable to interconnected the switch 65 with the clock pulse generator 45 and the switch 42 for determining the maximum duty factor $(\tau/T)$, so as to relate the value of $Z_2$ to the variation of the pulse duration $\tau$.

As described in the foregoing disclosure, according to the present invention, the voltage and currents at different parts of an electrical discharge machining device are separately detected, and the quantities thus detected are logically processed for determining various operative conditions of the machining device for generating discerning signals representing the presence of such operative conditions. The machining operation of the device is controlled based on the relative frequency of such discerning signals, or based on ratios of different discerning signals, so that random phenomena such as arcing conditions and high gap conductances are statistically processed, for ensuring optimum automatic control of the machining operation. When detecting the presence or occurrence of the high gap conductance, based on the relative frequency of the discerning signals, a quantity representing the magnitude of the gap conductance is also measured, so that the electrode raising time is automatically selected based on the quantity thus measured which represents the magnitude of the gap conductance.

With a conventional electrical discharge machining device, the device is sometimes for a quite long period of time without having any discharge, and manual adjustment has been necessary so as to gradually increase the machining current after initiating stable discharge and to adjust the duty factor $(\tau/T)$. On the other hand, with the electrical discharge machining device according to the present invention, the above manual adjustment in the conventional device can all be replaced automatic control, so that considerable labor can be saved, and in addition, the risk of false operation caused by incorrect selection of the machining conditions can completely be eliminated.

If an encoder is mounted on the discharge machining device, the number of pulses can automatically be counted starting from the initiation of the discharge, so as to automatically measure the depth (length) of the electrode feeding, and the setting of a limit switch for detecting the machining depth can be dispensed with.

If two or more different machining conditions are detected during a single machining pulse, such as the occurence of a high gap conductance at the initial portion of the machining pulse and the normal machining discharge during the intermediate portion of the machining pulse, for each of the machining conditions thus detected, a count one is added at the corresponding counter. More particularly, if the machining conditions vary during one machining pulse, count one is added to each of the counters which count the machining conditions represented in such change during the one machining pulse.

In addition to what was illustrated in the control circuit 5 of the present invention, it is also possible to determine the ratio $W'/u'$ of a count $W'$ of the non-discharge conditions and another count $u'$ of the normal discharges, so that upon increase of the ratio $W'/u'$ in excess of a certain limit, the duty factor $(\tau/T)$ and the peak value of the machining current may be adjusted or varied. Similarly, the ratio between the count $u'$ of the normal discharge and the count of the occurrence of high gap conductances may be used as the basis for adjusting the duty factor $(\tau/T)$, the Injecting pressure of the machining fluid, and the Peak value of the machining current. The ratio $Q'/u'$ between the count $Q'$ of the arcing conditions and the count $u'$ of the normal discharge, and other ratios of the counts of different machining conditions can also be used as the basis for the control of the electrical discharge machining device of the present invention.

The detection of different machining conditions is shown in Table I together with control measures to be taken for each of the different machining conditions.

TABLE I

| Machine condition | DT1 | DT2 | DT3 | DT4 | Encoder pulse density | Discerning time | Logical control input and control results in the circuit of Fig. 4 |
|---|---|---|---|---|---|---|---|
| Non-discharge (without high conductance). | H | L | H | L | | $t_2$ to $t_3$ | An input to counter 37, and with high count for this condition, the ratio $\tau/T$ becomes small. |
| Short-circuited ($t_1$ to $t_2$) | L | H | | | | $t_1$ to $t_2$ | When the ratio of the total pulse count and the short-circuit count exceeds Q/P, $\tau/T$ is reduced. |
| Short-circuited ($t_2$ to $t_3$) | L | H | | | | $t_2$ to $t_3$ | Machining chopper and high-voltage chopper are turned off. (Thus, high-voltage side is not included in the logical conditioning.). |
| Arcing condition (detected during $t_1$ to $t_2$). | H | H | | | | $t_1$ to $t_2$ | When the ratio of the total pulse count and the arcing condition count exceeds Q/P, $\tau/T$ is reduced. |
| Normal discharge machining | H | H | L | H | Dense | $t_2$ to $t_3$ | An input to counter 34. Since the count at the counter 34 is small, $\tau/T$ is not changed. |
| Do | H | H | L | H | Sparce | $t_2$ to $t_3$ | An input to counter 34. As the ratio $\mu/R$ of the count of the counter 34 and the count of total pulse number counter 27 exceeds a certain value, $\tau/T$ increases. |
| Do | H | H | L | H | Very sparce. | $t_2$ to $t_3$ | In addition to the above, the machining area is presumed to be large, and the maximum value of $\tau/T$ increases. |
| Gap conductance (detected during $t_2$ to $t_3$). | H | L | L | H | | $t_2$ to $t_3$ | Electrode raising time is determined based on ratios $S/R_1$, $S/R_2$, $S/R_3$ . . . $S/R_n$ between the gap conductance count $S$ and |
| Other combination of gap conductance (detected during $t_2$ to $t_3$). | H | L | H | H | | $t_2$ to $t_3$ | the total pulse count $R$. (Electrode raising time can be zero.) |

NOTE: H stands for a high output voltage; L stands for a low output voltage.

In the illustrated embodiment of the invention, only four comparators DT1 to DT4 are used, with an intention of minimizing the number of such comparators, but it is possible to use two or more comparators having different sensitive ranges at each of the different parts of the device where the measurement is taken, so as to feed the output from all the comparators to the logic circuit. With such additional comparators, it becomes possible to effect more sofisticated control of the discharge machining device.

Although the present invention has been described by taking an example associated with a series-switching type discharge machining device, as shown in FIGS. 1 and 2, the present invention should be understood as being applicable to parallel-switching type discharge machining devices having switching elements disposed in parallel to the discharge gap across the electrode and the workpiece.

Figure 6:
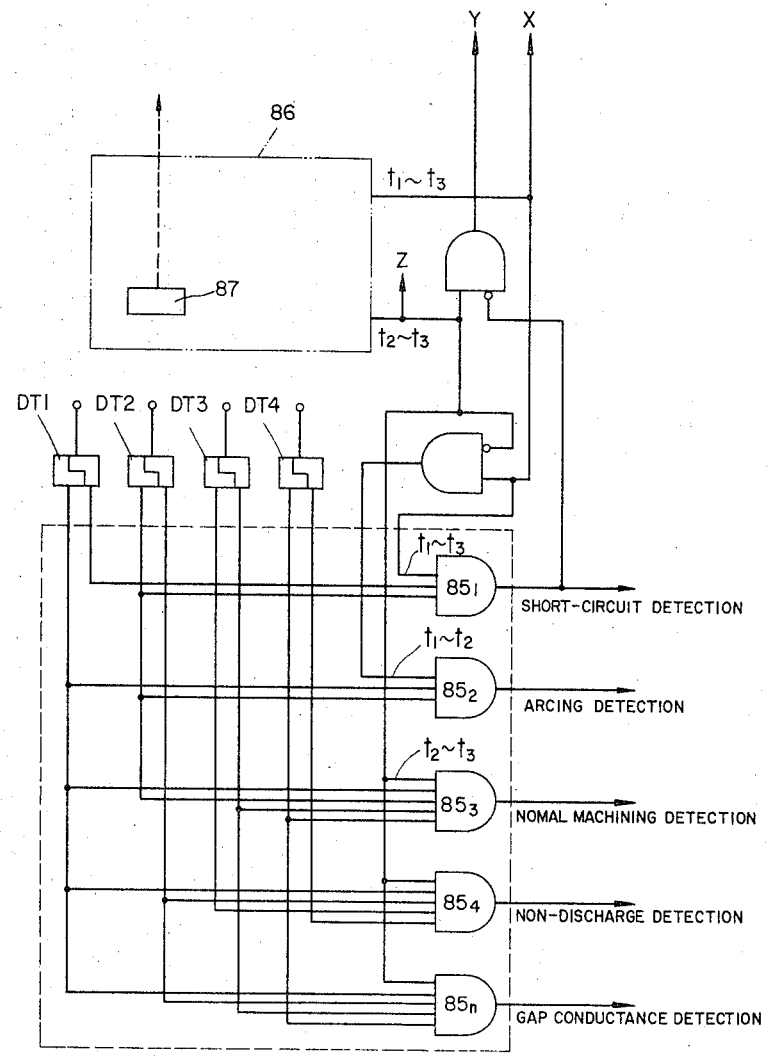
FIG. 6 is a schematic diagram of another logic circuit for determining the operative conditions of the discharge machining device.
Figure 7:
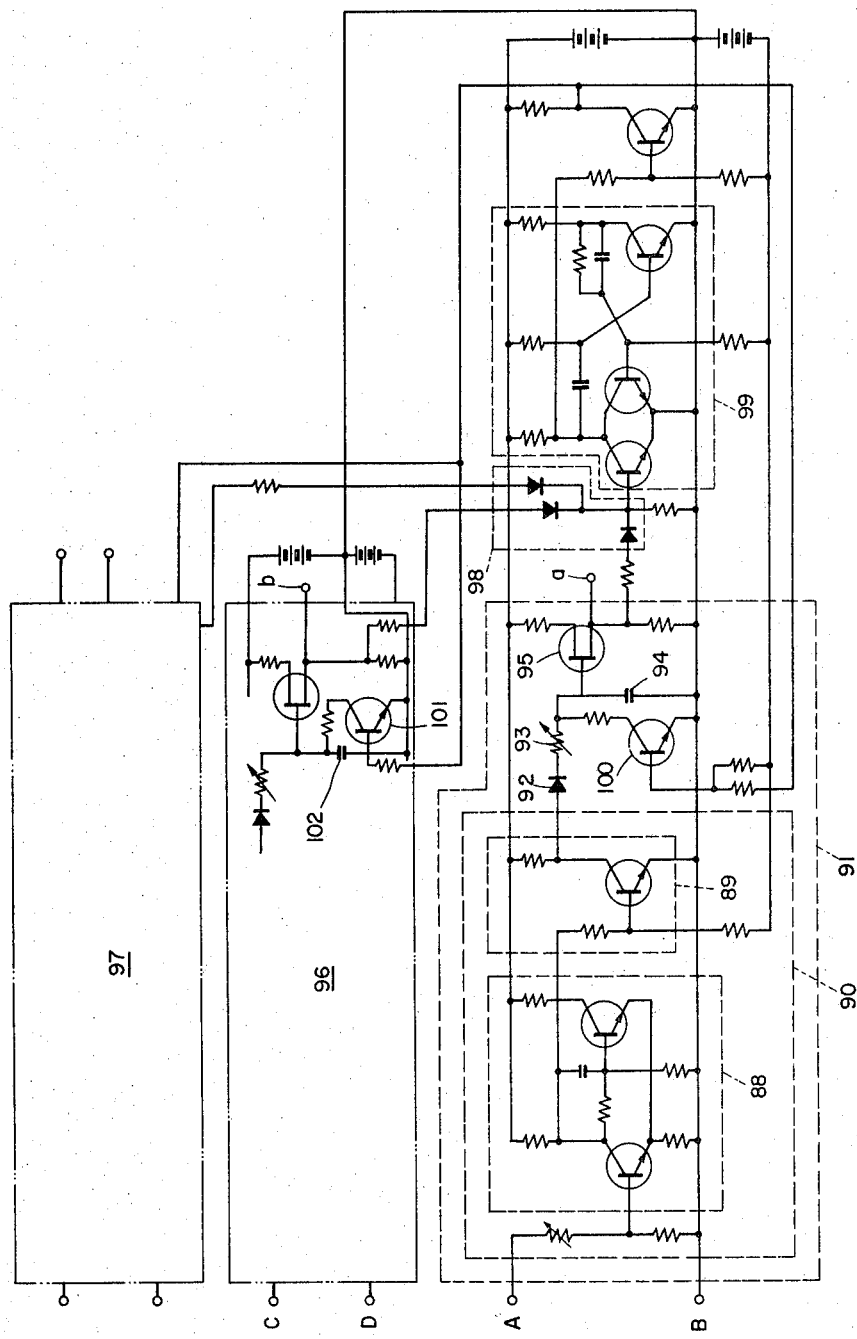
FIG. 7 is a schematic diagram of a control circuit for controlling the machining operation of the device.

FIGS. 6 and 7 illustrate another control circuit applicable to the present invention. In the circuit of FIG. 6, four detectors DT1 to DT4, which are similar to those of FIGS. 1 to 4, are used in the manner similar to those of the preceding embodiment. AND gates $85_1$ to $85_n$ constitute a logic circuit for detecting various machining conditions of the electrical discharge machining device of the invention in response to the output signals from the detectors DT1 to DT4, which machining conditions include short-circuit conditions, arcing conditions, normally discharging conditions, non-discharge condition, and the occurrence of high gap conductance, etc. A pulse generator 86 and a clock pulse generator 87 are operatively connected to the logic circuit.

In the Embodiment of FIGS. 6 and 7, since the type of detectors DT1 to DT4, and their connection to other elements in the discharge machining circuit are both identical with those of the preceding embodiment, the relation of Table I is also applicable to the control circuit of FIGS. 6 and 7 for detecting different machining or operative conditions of the machining device.

Figure 5:
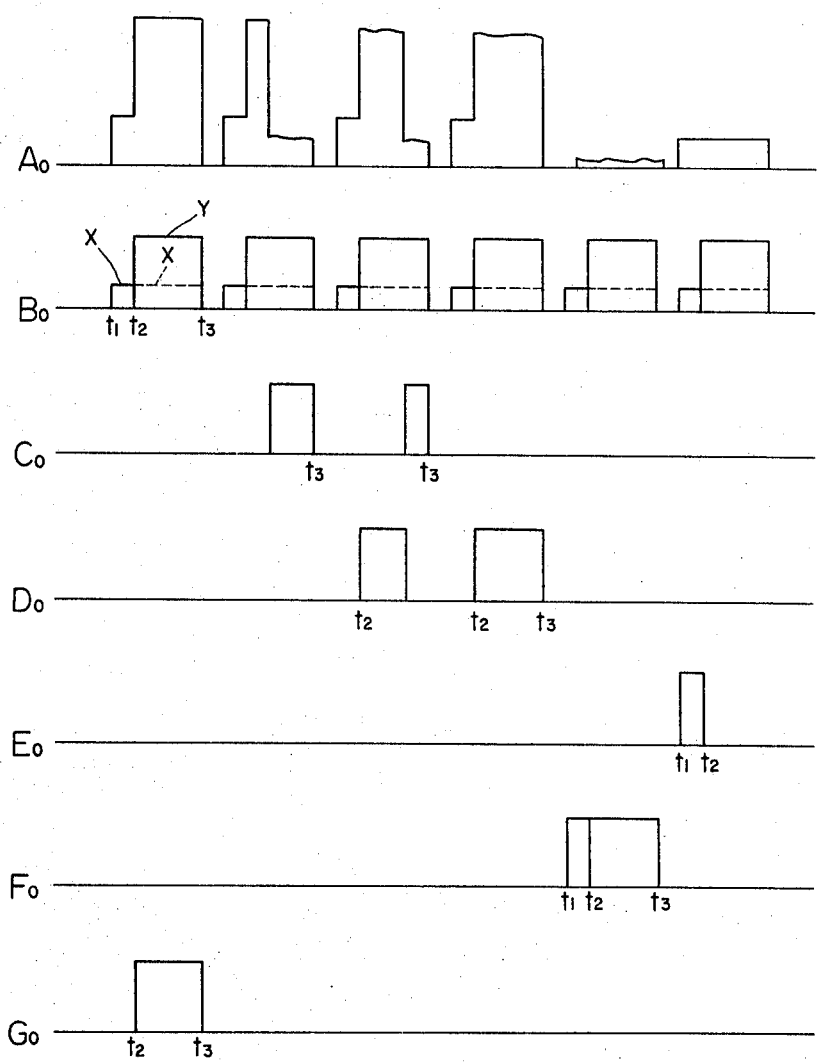
FIG. 5 is a diagrammatic illustration of waveforms of various signals in the discharge machining device of the present invention.

FIG. 5 shows waveforms of pulses applied across a discharge gap between a machining electrode 7 and a work piece 8, together with wave forms of discerning signals delivered from the logic circuit in response to the detection of different machining conditions of the machining device. In FIG. 5, symbols $A_o$ to $G_o$ represent the following pulses.

$A_o$ : Voltage across the discharge gap $B_o$ : Output from pulse generators, with the manner in which the pulses are superposed.

$C_o$ : Discerning signal representing the normal discharge.

$D_o$ : Discerning signal representing the occurrence of high gap conductance.

$E_o$ : Discerning signal representing the arcing condition.

$F_o$ : Discerning signal representing the short-circuiting condition.

$G_o$ : Discerning signal representing non-discharge condition.

The discerning signals $C_o$ to $G_o$ are generated only when the related conditions, as illustrated in Table I, are established by the detectors DT1 to DT4, so that the occurrence of such discerning pulses is at random, but its amplitude is made constant by each Schmitt circuit of the detector. The pulse duration of each discerning signal also varies considerably, depending on the type of the machining condition to which the discerning signal is related, because of the relation of Table I. Since the amplitude of the discerning signal is constant, the average voltage of such discerning signal represent the duration of the specific machining condition to which each discerning signal is related. Accordingly, if the duration of each machining condition at the discharge gap across the machining electrode 7 and the workpiece 8 is assumed to be constant, then the average value of the discerning signal depends only on the duty factor ($\tau/T$) by not on the repetition frequency $f$ and the pulse duration $\tau$. Thus, if the discerning signals consisting of constant-amplitude pulses are directly integrated, it becomes possible to eliminate the sampling circuit of the preceding embodiment, in which the number of the pulses (slope) is counted (a kind of integration).

FIG. 7 illustrates an embodiment of a circuit for determining the ratio between the output pulses from the logic circuit and the output pulses from the pulse generator or the ratio between different output pulses from the logic circuit. With the circuit of FIG. 7, the desired ratio is given as an analog quantity. A ratio control circuit 91 (to be referred to as an "integrating circuit", for brevity's sake) is provided, which includes an amplitude limiter 90 consisting of a Schmitt circuit 88 and a transistor switch 89 for ensuring the constant amplitude feature of the discerning signals delivered from the logic circuit. The output from the amplitude limiter 90 is used to charge a capacitor 94 through a detent diode 92 and a resistor 93. The electric charge thus stored in the capacitor 94 represents the time accumulation (an integral) of a certain machining condition (e.g., the occurrence of high gap conductance). When the voltage across the capacitor 94 exceeds a quantity given by

[(power source voltage E) × (stands off ratio, 0.6 to 0.750 ], a unijunction transistor 95 is turned on to deliver an output pulse to the output terminal $a$.

In order to determine the ratio between the output from the pulse generators and the output signals from the logic circuit or the ratios between different output signals from the logic circuit, the embodiment of FIG. 7 includes additional analog integrating circuits 96 and 97 connected in parallel to the aforesaid analog integrating circuit 91.

Let it be assumed now that the two integrating circuits 91 and 96 act to simultaneously integrate two different output signals, then either one of the integrating circuits produces its output signal earlier than the other integrating circuit. The output terminals of the integrating circuit 91 and 96 are designated by $a$ and $b$, respectively. Let it further be assumed that the integrating circuit 91 acts to integrate the output signals from the pulse generator (at the terminal Z of FIG. 6) during the time period $t_2$ to $t_3$, while the other integrating circuit 96 acts to integrate the output signals from the AND gate $85_n$ (FIG. 6) for producing discerning signals for the occurrence of high gap conductance. If the integrating time constants and the stand off ratios are Identical with each other between the two integrating circuits 91 and 96, and if the integrating circuit 91 produces an output signal at its output terminal $a$ earlier than the other integrating circuit 96, it means that no high gap conductance occurred throughout the subject integrating period.

Accordingly, if a suitable ratio (percentage) is set between the integrating time constants of the two integrating circuits, the relative frequency of the occurrence of the high gap conductance during the given integrating period can be detected. More particularly, if the relative frequency of the occurrence of the high gap conductance exceeds the preset ratio between the two integrating constants, the terminal $b$ will have an output signal earlier than the terminal $a$, but if the relative frequency is smaller than the present ratio, the terminal $a$ with be energized prior to the terminal $b$.

It should be noted here that the earlier there terminal $b$ is energized, the higher the gap conductance is. Whenever an output signal is delivered to the terminal $b$, a suitable measure is taken to remove such high gap conductance; for instance, by raising the electrode for a certain period of time, vibrating the electrode, injecting an insulating fluid into the discharge gap as raising the electrode, varying the pressure of the insulating fluid being injected, switching the injection to suction, regulating the machining voltage, applying a high voltage while increasing the discharge gap, or by applying a suitable combination of such measures. The sooner the appearance of the output pulse at the terminal $b$ after the beginning of the integration, there greater the raising stroke of the electrode may be while increasing its lowering speed for ensuring the complete elimination of the gap conductance.

As soon as the output pulses appear at the terminal $a$ or $b$, such pulses are also fed to a monomulti vibrator 99 through a diode OR circuit 98. Thus, transistors 100 and 101 of the integrating circuits 91 and 96 are turned on during the period when the monomulti vibrator 99 is operated. Whereby, the capacitors 94 and 102 of the integrating circuits are discharged. When the transistors 100 and 101 are turned off after the actuating period of the monomulti vibrator 99, the integration of the discerning signals is resumed.

In the foregoing description, the voltages and currents at different parts of the discharge machining device are independently detected, and signals produced in response to such detection are fed to AND circuits for converting them into logical or discerning signals which represent different machining conditions of device. The control of the machining device was effected based on the relative frequency or relative density between such logical signals and the output signals pulse generators or between different logical signals.

The electrical discharge machining device of the present invention can also be controlled by using other signal ratios. For instance, the input terminals of the integrating circuit 91 may directly be connected to suitable ones of the detectors DT1 to DT4. More particularly, it is possible to independently detect the voltage and the current at different parts of the Machining device and to determine the machining conditions based on the mutual relations among the output Signals from such detectors or on the relative ratio between such output signals and the output signals from Pulse generators.

For example, input terminals A and B of the analog integrating circuit 91 may be connected to the input to the detector DT2, while connecting the input terminals C and D of the analog integrating circuit 96 to the input to the detector DT4, so that a quantity corresponding to the gap conductance can be determined by the ratio between the signals from the two detectors DT2 and DT4. More particularly, if the terminal $b$ of the integrating circuit 96 generates signals prior to the terminal $a$ of the integrating circuit 91, it means that the gap conductance is comparatively high.

On the other hand, if the output from the pulse generator 86 during the time period $t_2$ to $t_3$ (FIG. 6) is applied to the input of the integrating circuit 91, while connecting the detector DT2 to the other integrating circuit 96, the duration of the discharge current relative to the pulse applying time can be determined by checking the time difference between signals appearing at the terminals $a$ and $b$ of the integrating circuits 91 and 96. In order to keep a constant ratio between the duration of the discharge current and the pulse applying time, the voltage across the discharge gap (a set voltage) may be regulated or the duty factor ($\tau/T$) may be modified. Furthermore, in order to keep the aforesaid ratio constant, the inputs of the integrating circuit 96 and 97 may directly be connected to the input of the detector DT2, while setting the integrating time constant of the circuit 97 slightly smaller than that of the circuit 96. Then, the integrating circuit 97 will generate output signals, but the integrating circuit 96 will not produce its output signals. If the integrating circuit 91 can be so adjusted as to produce output signals, it means that the ratio of the machining current is above a preset lower limit thereof. After the generation of an output signal by the integrating circuit 97, if the integrating circuit 96 produces its output signal which is followed by the output of the integrating circuit 91, it means that the ratio of the machining current is larger than a preset upper limit thereof. If the integrating circuits 91, 96 and 97 are so connected as to discharge the capacitors 94 and 102 upon operation of the monomulti vibrator 99, the integrating operation can be resumed after the discharge of the capacitors.

Thus, if the output signals from the integrating circuits 96 and 97 are so regulated so as to alternatingly precede the output pulse of the integrating circuit 91, by suitably regulating the machining conditions of the device, the ratio of the output from the pulse generator 86 in the time period $t_2$ to $t_3$ and the machining current can be kept substantially within a certain range.

As described in the foregoing disclosure, according the embodiment of FIGS. 5 to 7, the machining conditions of an electrical discharge machining device can be controlled by detecting the relative voltages at different parts of the device, and the relative voltages or the voltage ratios at different parts of the device can be determined by using analog integrating circuits without using an sampling circuits as shown in the preceding embodiment. The analog integrating circuits of the second embodiment very simple, so that the integrating circuits enables the simplification of the overall machining circuitry at a comparatively low cost.

The use of a plurality of such inexpensive analog integrating circuits in parallel enables the determination of the ratio of the machining output voltage and the specific machining condition, the ratio of different machining conditions, or the ratio of the specific machining condition to the output or the duration of the pulse generator, simply by means of finding the first integrating circuit which generates output signals before any other integrating circuits. With the knowledge of such ratio, the relative magnitude of the machining current can be kept substantially constant.

With the control circuit of the present invention, it is possible to effect the determination and control of the machining area, which has been considered to be impossible with conventional electrical discharge machining devices.

In the illustrated embodiment of the analog integral circuits, unijunction transistors have been used, but any other suitable ratio detecting circuitry consisting of electronic components can also be used in the device of the present invention.

The control circuitry as disclosed in the present application can be used not only in the independent impulse type machining device, but also in the dependent impulse type machining device.

Although the present invention has been described with a certain degree of particularlity, it is understood that the present disclosure has been made only by way of example and that numerous changes in the details of construction and the combination and arrangement of parts may be resorted to without departing from the spirit and the scope of the present invention as hereinafter claimed.

What is claimed:

1. Device for machining a conductive workpiece by an intermittent discharge of a relatively large pulsed electric power for machining added onto a relatively small pulsed electric power for insulation breaking-through, being applied across a gap between said workpiece and a movable electrode, said device comprising; at least two means for separately and independently detecting voltages and currents of said pulsed power in the machining circuit; logic circuit means for analyzing in combination the detected voltage and current values to produce at least one of the signals representative of normal machining condition, non-discharge condition, short circuit condition, gap conductance condition and arcing condition; and means for counting the number of said respective signals for comparison with a number of control signals to provide a ratio of a predetermined value; and means for regulating, in response to deviation from said predetermined ratio value, at least one of a plurality of machining control factors including peak value of the machining current, current and voltage of the machining pulsed power, current and voltage of the breaking-through pulsed power, pulse width, wave form, pause time, rate and extent of electrode movement, duty factor, flow and pressure of the machining liquid to be fed, and short circuit current.

2. Device as claimed in claim 1, comprising means for determining a quantity corresponding to the magnitude of the gap conductance in proportion to the magnitude of the deviation from said ratio value, and means for controlling the extent of electrode movement in response to said quantity.

3. Device as claimed in claim 1, comprising means for determining a quantity corresponding to the magnitude of the gap conductance in proportion to the magnitude of the deviation of said ratio value; and means for controlling the rate of electrode movement in response to said quantity.

4. Device as claimed in claim 1, comprising an encoder for generating pulses representative of extent of electrode movement so as to provide a ratio of the number of said pulses counted with the number of the normal discharge pulses counted in said metering means, said encoder utilizing said ratio for directly controlling the duty factor.

5. Device as claimed in claim 1, comprising an encoder for generating pulses representative of rate of electrode movement so as to provide a ratio of the number of said pulses counted with the number of the normal discharge pulses counted in said metering means, said encoder utilizing said ratio for directly controlling the duty factor.

6. Device as claimed in claim 1, comprising pulse generator circuit means and sampling circuit means, the outputs of said circuits being connected so that the output signals from the former are counted with the latter; and means responsive to the number of counted signals reaching a preset value in said sampling circuit means for generating said signal on the output side of said sampling circuit means, said signal being adapted to actuate the logic circuit means.

7. Device as claimed in claim 1, said counting means comprising at least two analog integration circuit means into which at least two signals representative of machining conditions are supplied from said logic circuit means so as to form earlier pulses on the output side of either of said integration circuit means; and means utilizing said differential time relation for regulating the machining control factors.

8. Device as claimed in claim 7, comprising a pulse generator generating output signals adapted to be used as one of said two signals.

9. Device as claimed in claim 7, comprising clock pulse generator means generating output signals adapted to be used as one of said two signals.

10. Device as claimed in claim 7, comprising pulse generator means and clock pulse generator means respectively generating output signals adapted to be used for regulating said machining control factors.

* * * * *